United States Patent
Prandelli

(10) Patent No.: US 10,646,067 B2
(45) Date of Patent: May 12, 2020

(54) SUPPORT DEVICES FOR LIDS OF COOKING CONTAINERS

(71) Applicant: Vigilio Prandelli, Brescia (IT)

(72) Inventor: Vigilio Prandelli, Brescia (IT)

( * ) Notice: Subject to any disclaimer, the term of this patent is extended or adjusted under 35 U.S.C. 154(b) by 172 days.

(21) Appl. No.: 15/116,833

(22) PCT Filed: Feb. 5, 2015

(86) PCT No.: PCT/IB2015/050876
§ 371 (c)(1),
(2) Date: Aug. 5, 2016

(87) PCT Pub. No.: WO2015/118476
PCT Pub. Date: Aug. 13, 2015

(65) Prior Publication Data
US 2017/0188749 A1    Jul. 6, 2017

(30) Foreign Application Priority Data

Feb. 7, 2014 (IT) .............................. BS2014A0040

(51) Int. Cl.
| | |
|---|---|
| *A47J 36/12* | (2006.01) |
| *A47J 27/08* | (2006.01) |
| *A47J 36/10* | (2006.01) |
| *A47J 27/00* | (2006.01) |

(52) U.S. Cl.
CPC .......... *A47J 36/12* (2013.01); *A47J 27/0804* (2013.01); *A47J 36/10* (2013.01); *A47J 27/00* (2013.01)

(58) Field of Classification Search
CPC .... B65D 2251/1008; B65D 2251/1016; B65D 2251/105; B65D 2251/1058; A47J 36/12; A47J 36/10; A47J 36/06; A47J 27/0813; A47J 27/0811; A47J 27/0804; A47J 27/08; A47J 27/00
USPC .... 220/831, 832, 833, 834, 835, 810, 573.1, 220/912
See application file for complete search history.

(56) References Cited

U.S. PATENT DOCUMENTS

| | | | | |
|---|---|---|---|---|
| 1,210,813 | A | * | 1/1917 | Koopmann ............. A47J 36/08 210/245 |
| 1,745,548 | A | * | 2/1930 | Lerner .................... A47J 36/12 217/61 |
| 2,705,657 | A | * | 4/1955 | Di Giorgio ............ A47J 45/10 220/744 |

(Continued)

FOREIGN PATENT DOCUMENTS

EP        2218380 A1    8/2010

*Primary Examiner* — Anthony D Stashick
*Assistant Examiner* — Onekki P Jolly
(74) *Attorney, Agent, or Firm* — Arent Fox LLP; Michael Fainberg

(57) ABSTRACT

Support devices are provided for a lid of a cooking container such as, for example, a pan, pot or casserole, which includes an annular element suitable for resting on a rim of the container that delimits the opening of a compartment of the cooking container containing food, and a support arm hinged to the annular element. The support arm is provided with attachment elements to the lid and is movable between a lowered position, in which it permits the lid to rest on the annular element so as to close the compartment of the cooking container, and a raised position, in which it distances the lid from the annular element to permit access to the compartment.

13 Claims, 11 Drawing Sheets

(56) References Cited

U.S. PATENT DOCUMENTS

| | | | | |
|---|---|---|---|---|
| 2,808,175 | A * | 10/1957 | Aiken | A47J 36/10 220/379 |
| 3,081,394 | A * | 3/1963 | Arel | A47J 37/101 219/438 |
| 3,763,760 | A * | 10/1973 | Erickson | B60H 1/3435 454/145 |
| 3,973,694 | A * | 8/1976 | Tess | A47J 27/092 220/203.06 |
| D263,782 | S * | 4/1982 | Jackson | D7/358 |
| 4,636,924 | A * | 1/1987 | Targetti | F21V 21/30 362/277 |
| D295,817 | S * | 5/1988 | Sebillotte | D7/358 |
| 6,474,496 | B1 * | 11/2002 | Garton | B65D 90/00 220/4.12 |
| 6,705,209 | B2 * | 3/2004 | Yang | A47J 27/0802 219/440 |
| 7,762,438 | B2 * | 7/2010 | Skillin | B65D 47/0819 215/245 |
| 2006/0237468 | A1 * | 10/2006 | Dukes | A47L 13/512 220/735 |
| 2007/0210061 | A1 * | 9/2007 | Tynes | A47J 27/004 219/433 |
| 2008/0083730 | A1 * | 4/2008 | Dolgov | A47J 27/004 219/432 |
| 2011/0095031 | A1 * | 4/2011 | Welk | A47J 36/12 220/573.1 |
| 2012/0043328 | A1 * | 2/2012 | Pirner | B01L 3/50825 220/324 |
| 2012/0193364 | A1 * | 8/2012 | Zhong | A47J 36/10 220/573.1 |
| 2012/0216684 | A1 * | 8/2012 | Gregory | A47J 36/06 99/357 |
| 2013/0043253 | A1 | 2/2013 | Yang et al. | |
| 2013/0048661 | A1 * | 2/2013 | Dai | A47J 36/12 220/810 |
| 2013/0098921 | A1 * | 4/2013 | Yang | A47J 36/10 220/573.1 |

* cited by examiner

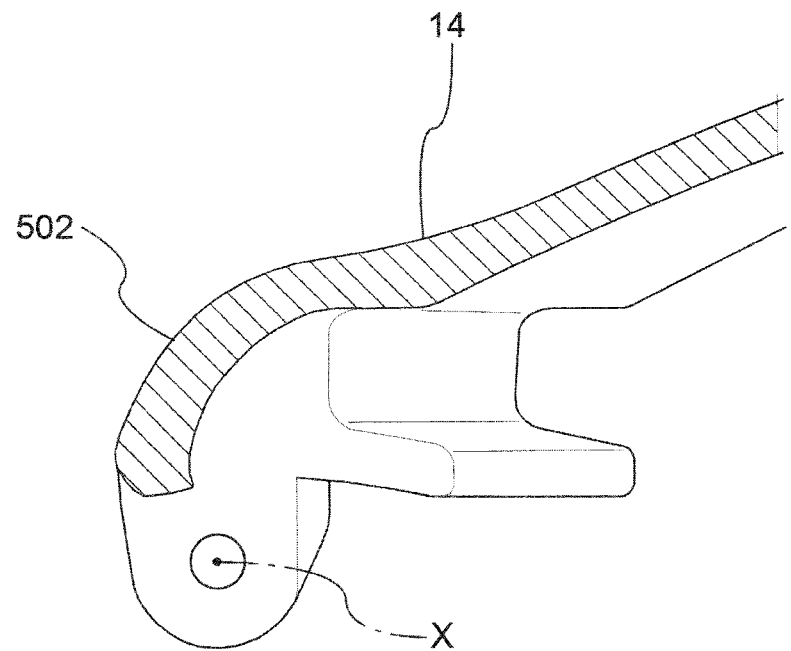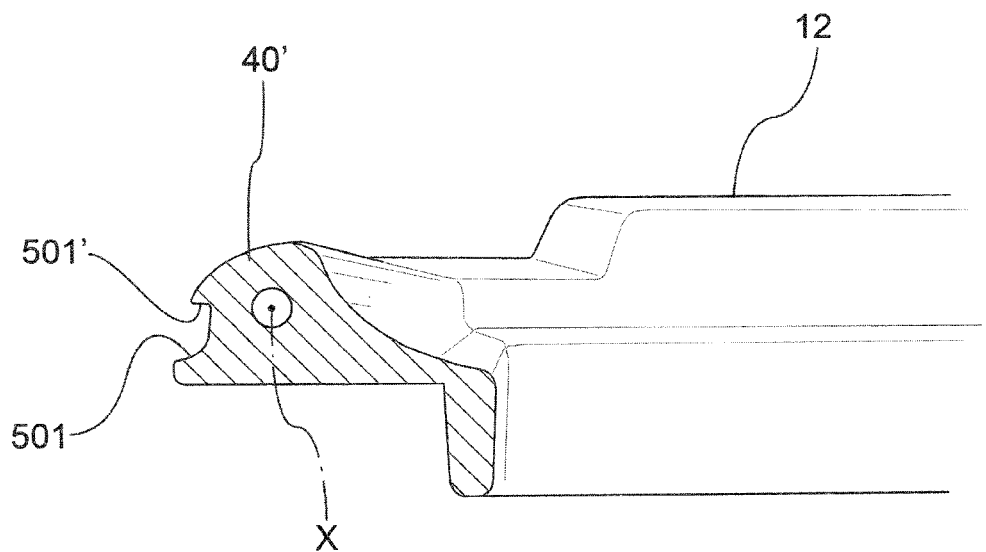
FIG.10

SUPPORT DEVICES FOR LIDS OF COOKING CONTAINERS

CROSS-REFERENCE TO RELATED APPLICATIONS

This application is a National Phase Application of PCT International Application No. PCT/IB2015/050876, International Filing Date, Feb. 5, 2015, claiming priority to Italian Patent Application No. BS2014A000040 (102014902231151), filed Feb. 7, 2014, each of which is hereby incorporated by reference in its entirety.

FIELD OF THE INVENTION

In this way, the user, when accessing the compartment of the container, does not have to worry about completely removing the lid from the container and has the availability of a free area near the container where he can place the lid.

BACKGROUND OF THE INVENTION

Lid support devices suitable to perform this function have already been proposed.

In certain cases, however, these known devices require that the cooking recipient be specifically made to receive the lid support device. Such devices are, therefore, only usable on a given container and cannot be regarded as an accessory associable to different containers, in particular in traditional containers, not designed to receive the support device.

An example of such support devices and the related containers is described in EP2218380A1.

In other cases, the support device is attachable to usual cooking recipients, but the coupling system is such as to make it complicated, if not impossible, to completely remove the support device with the related lid from the container during use of the container itself.

For these reasons, all these lid support devices have achieved very little success among users.

SUMMARY OF THE INVENTION

The purpose of this invention is to propose a lid support device for a cooking recipient able to overcome the limitations of the support devices proposed up to now.

This purpose is achieved with support devices as described and claimed herein.

The characteristics and advantages of the support devices according to the invention will, in any case, be evident from the following description of its preferred embodiments, provided by way of non-limiting examples, with reference to the detailed description and attached drawings.

BRIEF DESCRIPTION OF THE FIGURES

FIG. 10 is an enlarged cross section of the assembly in correspondence to the hinge, in separate parts.

DETAILED DESCRIPTION

Figure 1:
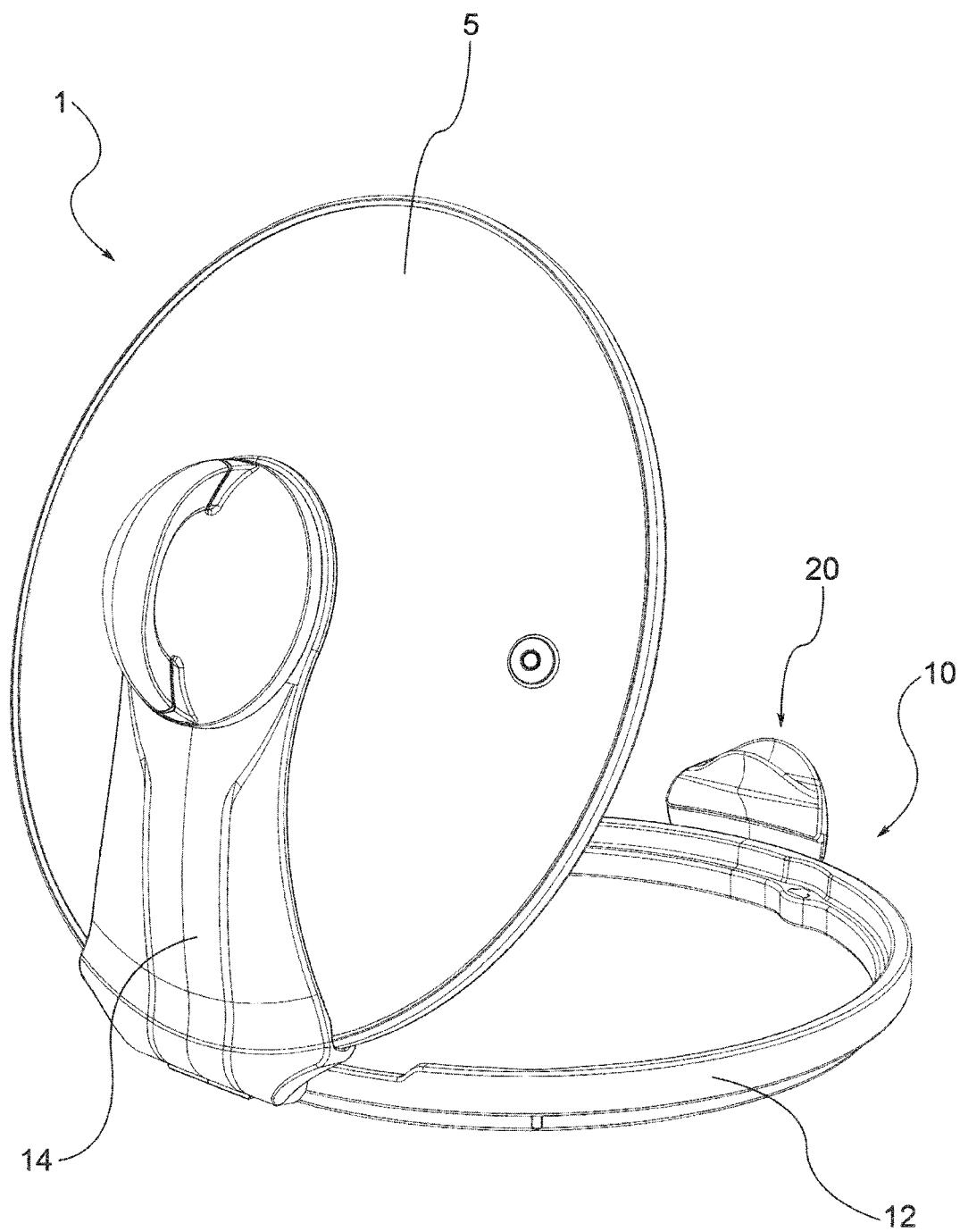
FIG. 1 is a perspective view of the closure assembly according to the invention, in the open position, comprising a lid for a cooking recipient and support device of said lid.

In said drawings, 1 indicates a closure assembly for a cooking recipient 2, such as a pot, a pan or a casserole, according to the invention as a whole.

The closure assembly 1 comprises a lid 5 suitable to close the compartment 6 of the container and a supporting device 10 for such lid 5.

In a general embodiment, the support device 10 comprises an annular element 12 suitable to rest against the rim 7 of the container, which delimits the opening of compartment 6. For example, the annular element 12 has a circular shape so as to rest on the circular rim 7 of usual cooking recipients. It is clear, however, that, depending on the shape of the compartment 6 of the container, the annular element 12 may assume other configurations, such as square, hexagonal, etc.

Figure 2:
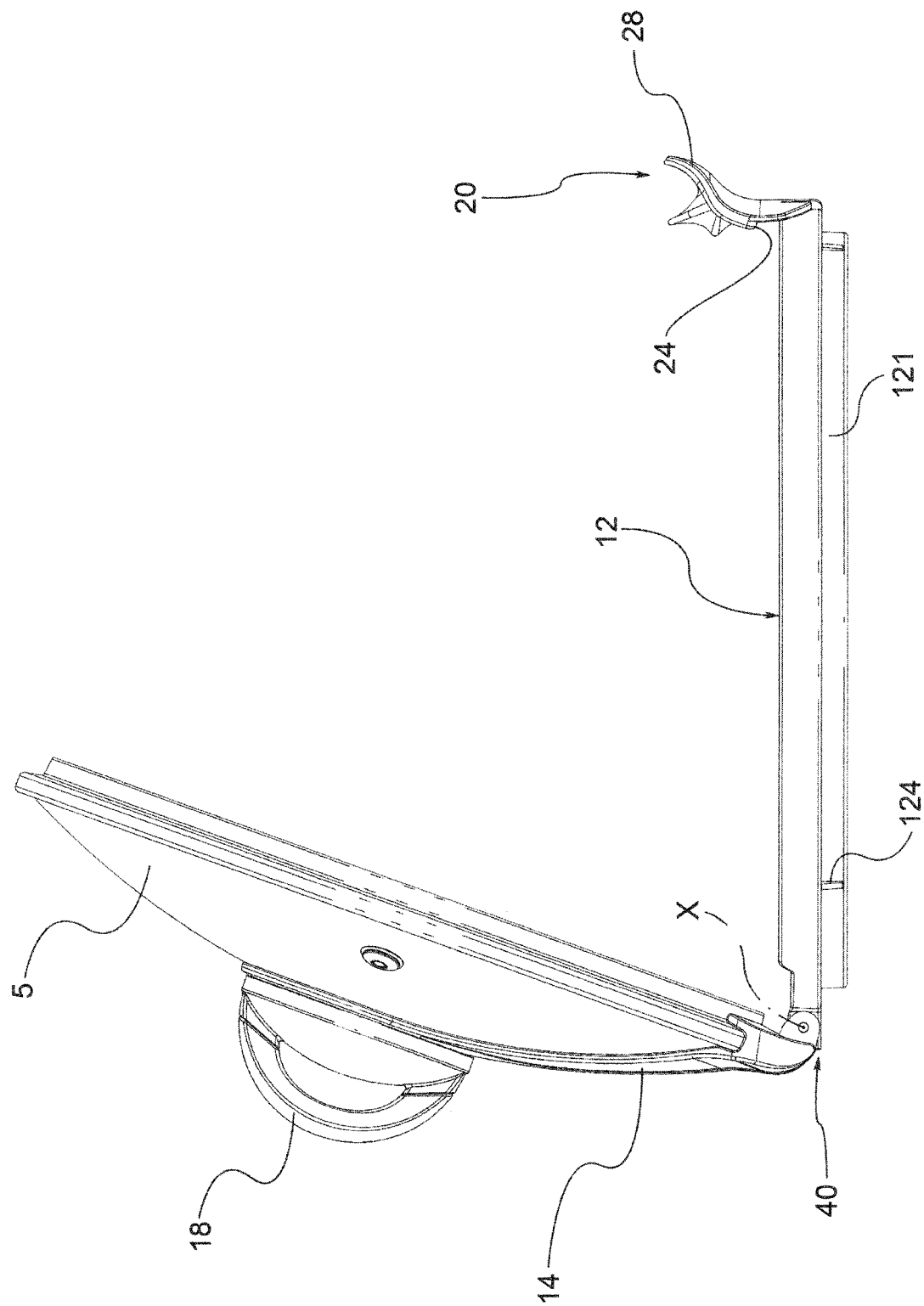
FIG. 2 is a side view of the assembly in the open position.
Figure 3:
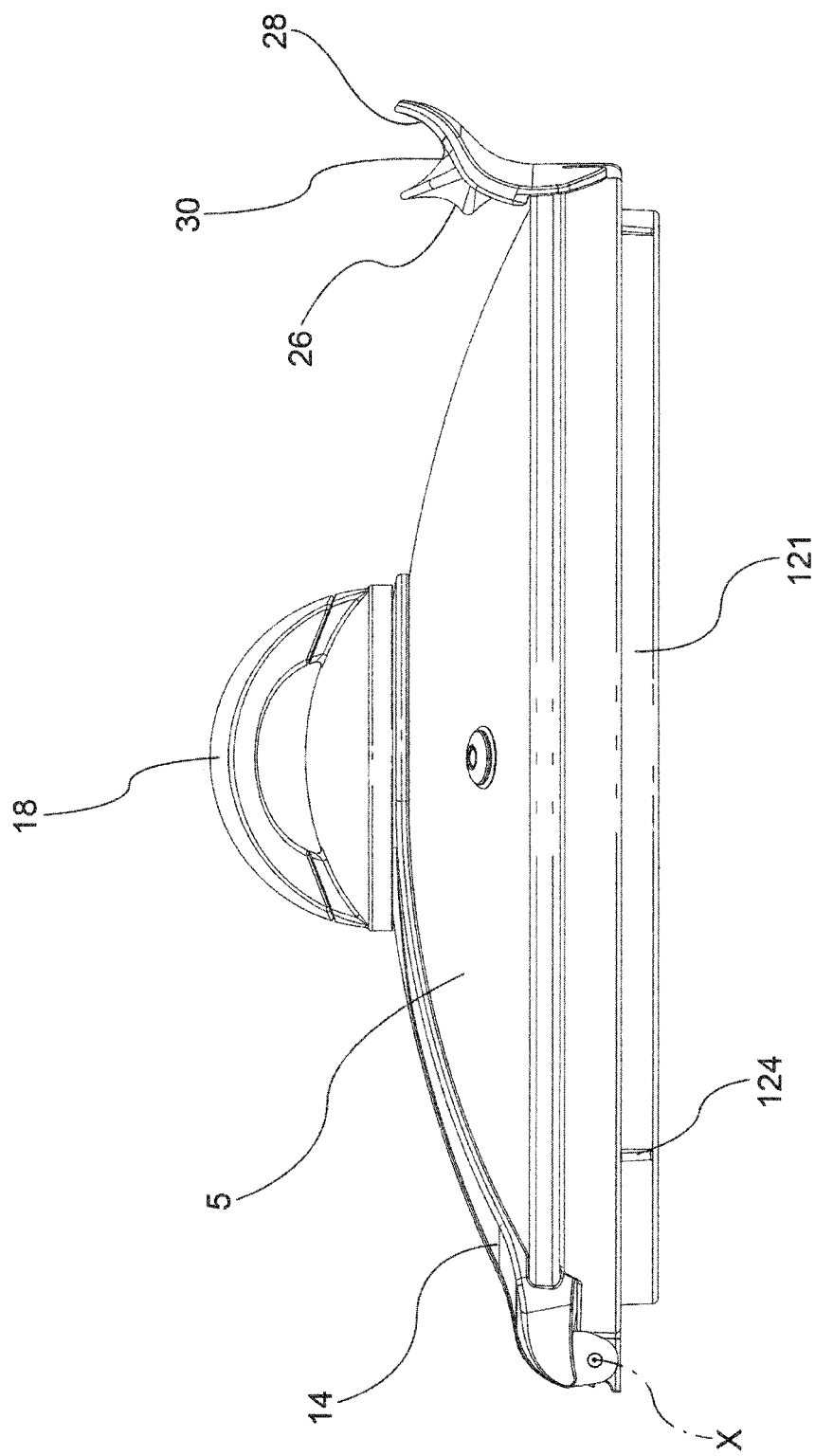
FIG. 3 is a side view of the assembly in the closed position.
Figure 4:
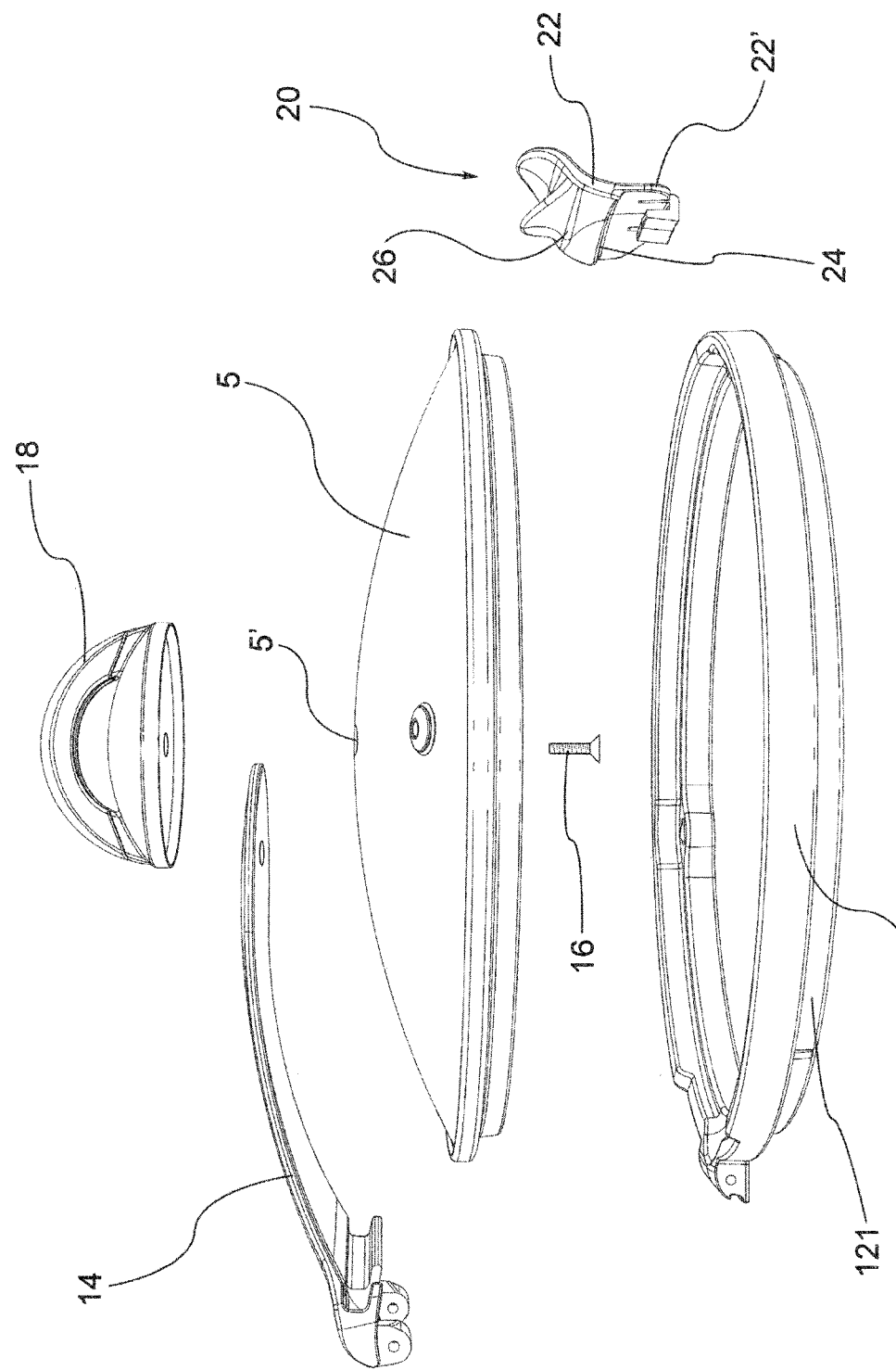
FIG. 4 is an exploded perspective view of the assembly.
Figure 5:
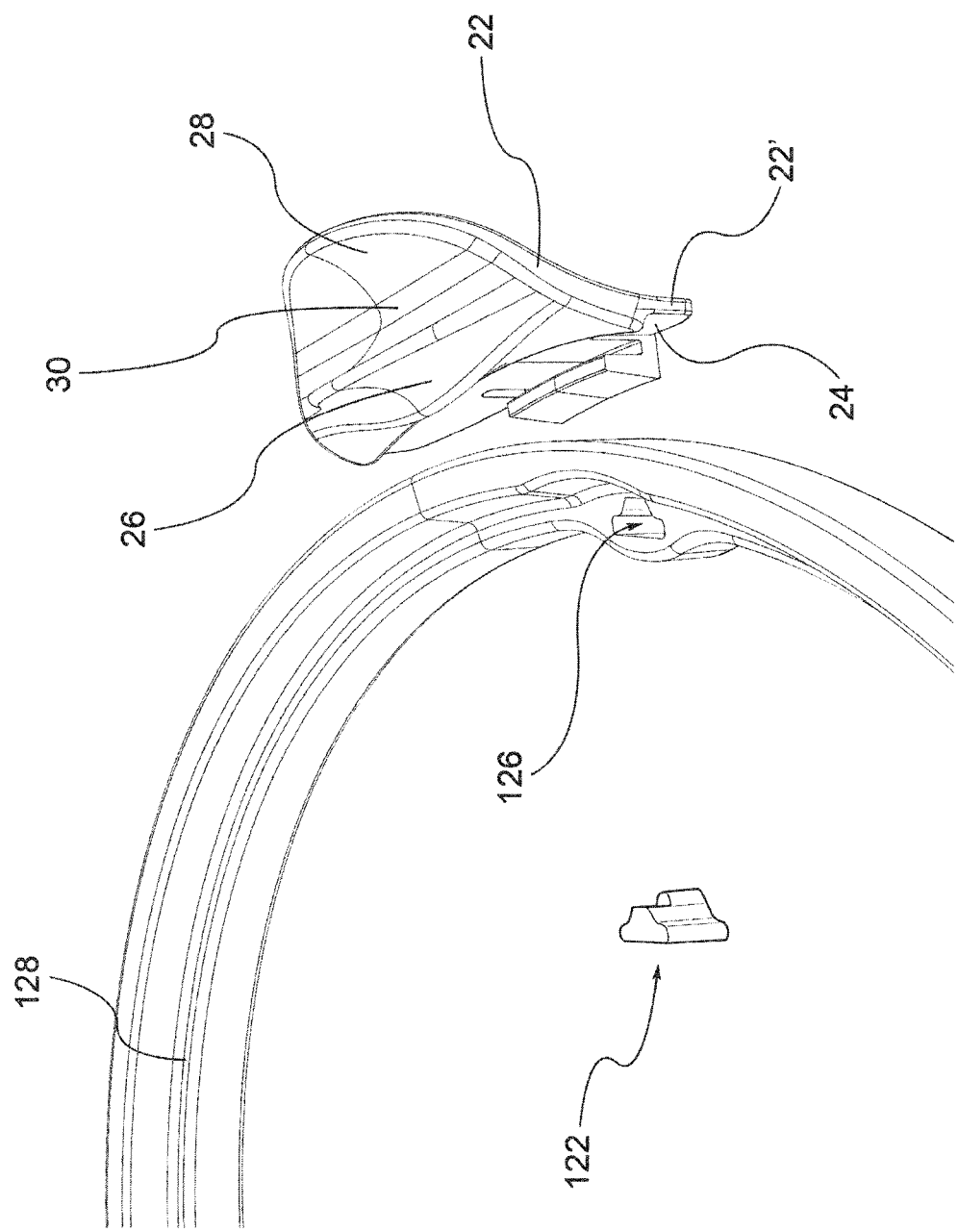
FIG. 5 shows, in perspective view from above and in separate parts, an enlarged portion of the annular element of the support device.
Figure 11:
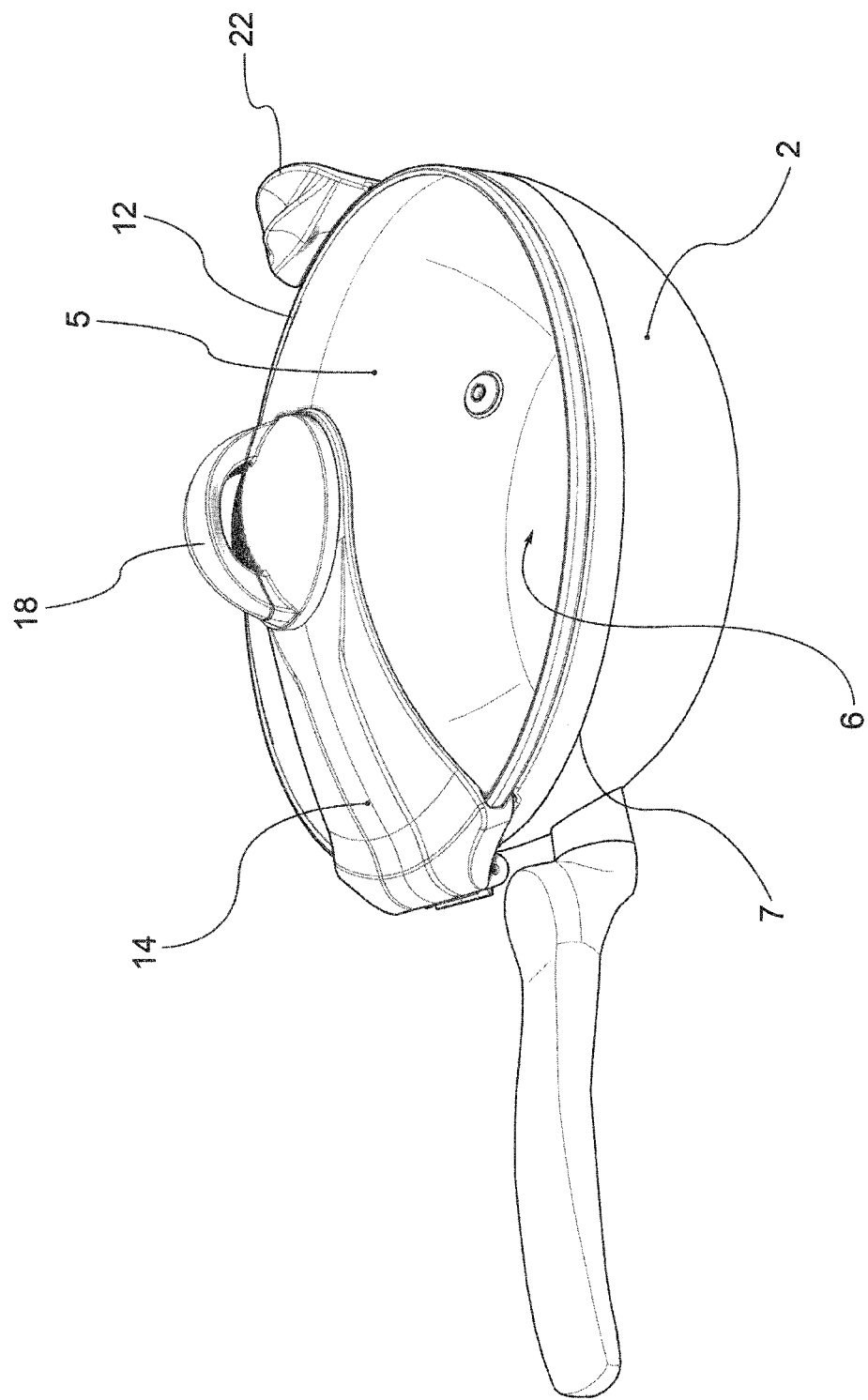
FIG. 11 shows the closure assembly applied to a cooking recipient.

A support arm 14 is hinged to this annular element 12. For example, the support arm 14 and the annular element 12 rotate about a hinge 40 whose axis of rotation X is tangential to the annular element 12. Said support arm 14 is provided with attachment elements 16 for connection to the lid 5, for example threaded means. Said attachment elements 16 make the lid 5 integral with the support arm 14. The latter is movable between a lowered position, in which it allows the lid 5 to rest on the annular support element 12 so as to close the compartment 6 of the container 2 (FIGS. 3 and 11), and a raised position, wherein the lid 5 moves away from said annular element to allow access to said compartment 6 (FIGS. 1 and 2).

In particular, when in the raised position, the support arm 14 and related lid 5 are near the vertical position, i.e., they are almost orthogonal with respect to the plane on which the annular element 12 lies. Preferably, as explained in more detail below, in the raised position, the support arm 14 is inclined by about 70° relative to the plane of the annular element 12.

In a preferred embodiment, the support arm 14 extends along, or above, the top surface of the lid 5, preferably at least up to the central point of the lid 5. Advantageously, the attachment elements 16 are provided in a coaxial position to the centre of the annular element 12. In other words, the coupling between the support arm 14 and the lid 5 takes place in correspondence to said central point of the lid 5, which central point is aligned to the centre of the annular element 12.

Advantageously, for attaching the lid 5 to the support arm 14, one can use the central hole 5' of the lid, which is already normally provided to connect a grip handle to the lid 5.

In a preferred embodiment, the support arm 14 is provided, preferably at the central point of the lid 5, with a knob or grip handle 18 for moving the support arm and the whole assembly 1 when the lid 5 is made integral to the annular element 12, as explained below.

According to a preferred embodiment, the annular element 12 is provided with blocking elements 20 of the lid suitable to keep the support arm 14 in a lowered position.

For example, said blocking elements 20 are configured to engage the top side of the outer rim of the lid 5.

In an embodiment, said blocking elements 20 comprise a lateral lever 22 that which extends upwards from the annular element 12 and which is movable between a blocking position and a release position of the lid 5. In particular, said lateral lever 22 defines an undercut 24 which, when the lever is in a blocked position, is suitable to engage the rim of the lid 5 at the top. The lateral lever 22 is movable between a substantially vertical blocking position, in which the undercut 24 engages the rim of the lid 5, and a position inclined towards the outside, wherein the undercut 24 is disengaged from said rim of the lid 5. When the lateral lever 22 is in this inclined position, it is possible for the user to lift the support arm 14. and then lift the lid 5 by from the annular element 12.

In an advantageous embodiment, a support tooth 26 is made in said lateral lever 22, above the undercut 24, suitable to allow the lid to rest in an intermediate position between the closed position and open position of the container. Said intermediate position allows, for example, the vapour that forms in the compartment 6 of the recipient 2 to vent without completely opening the lid 5. Note that, in an embodiment, the rim of the lid 5 can rest on the support tooth 26 only when the lateral lever 22 is in the vertical blocking position of the lid.

In an embodiment, the lateral lever 22 is elastically yielding. In other words, in the vicinity of its lower portion 22' of connection to the annular element 12, the lateral lever 22 is made with a thickness and/or a material such as to allow an elastic deformation of said portion sufficient to incline the lever towards the outside and bring it to the blocking position when pressure is no longer exerted on the lever. To this end, the lateral lever 22 terminates at the top with a grip tab 28 suitable to be gripped by the user at a safe distance from the lid 5.

Furthermore, in an advantageous embodiment, a concave support seat 30 is made in the lateral lever 22 to support a cooking utensil.

Returning now to the annular element 12, according to a preferred embodiment, it comprises a vertical wall 121 suitable to surround, at least partially, the rim 7 of the container. Said vertical wall 121 may be internal, as in the example of embodiment illustrated, or even external to said rim 7 of the container. Elastic compensation elements 122 are associated to said vertical wall 121, suitable to radially engage said rim 7. In other words, said elastic compensation elements 122, by elastically engaging the rim 7, allow the annular element 12 to adapt to containers having different profiles of the rim 7 and/or different dimensional tolerances. In this way, the annular element 12 is, in any case, always supported without radial play on the rim 7 of the container.

In an embodiment, the elastic compensation 122 comprise a plurality of elastic teeth 124, for example made of silicone, evenly distributed along the annular element 12 and projecting radially from said vertical wall 121. For example, these elastic teeth 124 are received in respective seats 126 formed in the enlarged portions of the vertical wall 121 and open on the side facing the rim 7.

Figure 6:
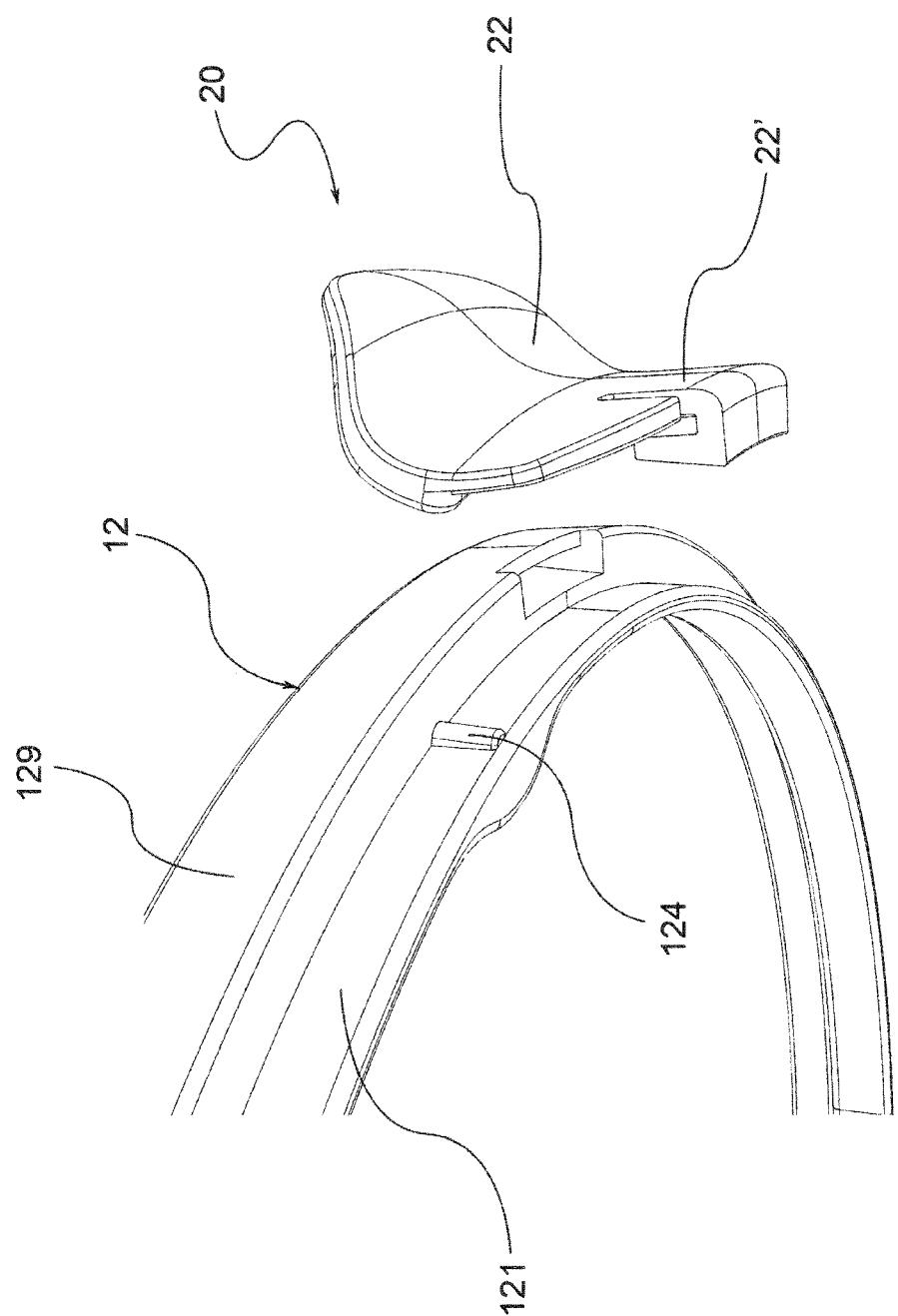
FIG. 6 is a view similar to the preceding, but from below.
Figure 7:
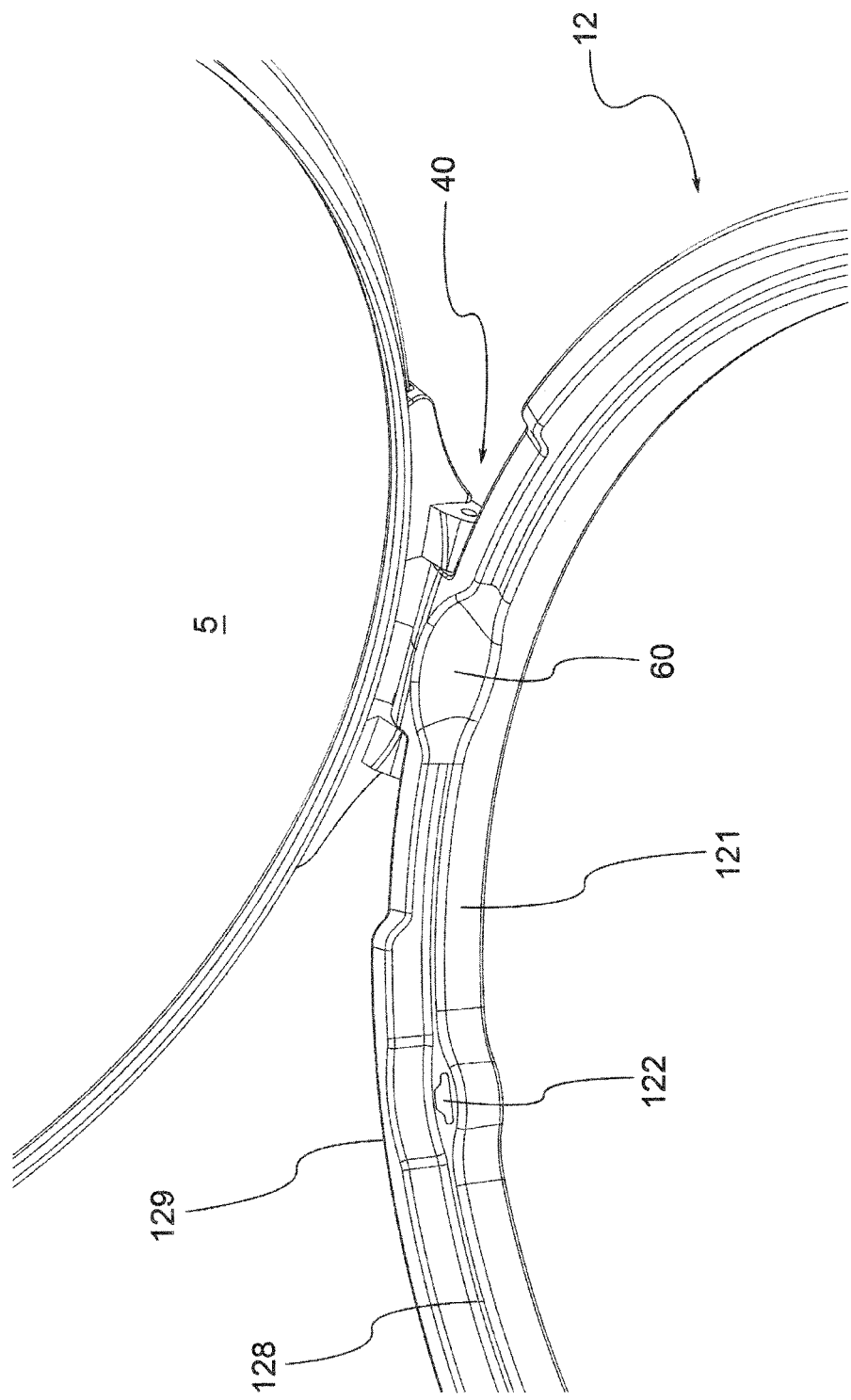
FIG. 7 shows, in perspective view, another enlarged portion of the annular element of the support device.

In an embodiment, the upper side of the annular element 12 may be shaped in a complementary manner to the underside of the rim of the lid 5, so that the closure of the compartment 6 of the container is as precise as possible. For example, the upper side of the annular element 12 forms a substantially horizontal plane 128 that is radially delimited by an external bead 129 on which the rim of the lid 5 rests. For example, said external bead 129 supports the lateral lever 22, as shown in particular in FIG. 6.

In any case, the annular element 12, while coupling with a certain radial interference to the rim 7 of the container 5, so as to avoid play, is simply resting on the rim 7. The support device 14, with the lid 5, may thus be removed from the container 2 like a normal lid, for example by lifting by means of the knob or grip handle 18, with the lateral lever 22 in the blocking position of the lid.

In an advantageous embodiment, the annular element 12 forms, at the connection hinge 40 to the support arm 14, a droplet collection chute 60 suitable to collect and channel inside the container the droplets forming on the inside of the lid 5.

According to a preferred embodiment, the support arm 14 and annular element 12 are provided with stop elements 50 which interact with each other to stop the support arm 14 in the raised position, for example inclined by about 70°, preventing its further rotation about the axis of rotation X and holding it in this position until the user voluntarily returns it to the closed position.

In an embodiment, the stop elements 50 are formed at the hinge 40, and comprise a stop slot 501 and an elastic stop tab 502 suitable to be engaged in said stop slot 501. The stop slot 501 extends parallel to axis of rotation X in a central portion 40' of the hinge 40 integral with the annular element 12 and is open towards the outside. The stop tab 502 is integral with the support arm 14 and embraces said central portion 40' of the hinge 40. For example, the elastic tab 502 is formed by making a pair of parallel slits 503 at the end of the support arm 14 connected to the annular element 12 by means of hinge 40.

Figure 8:
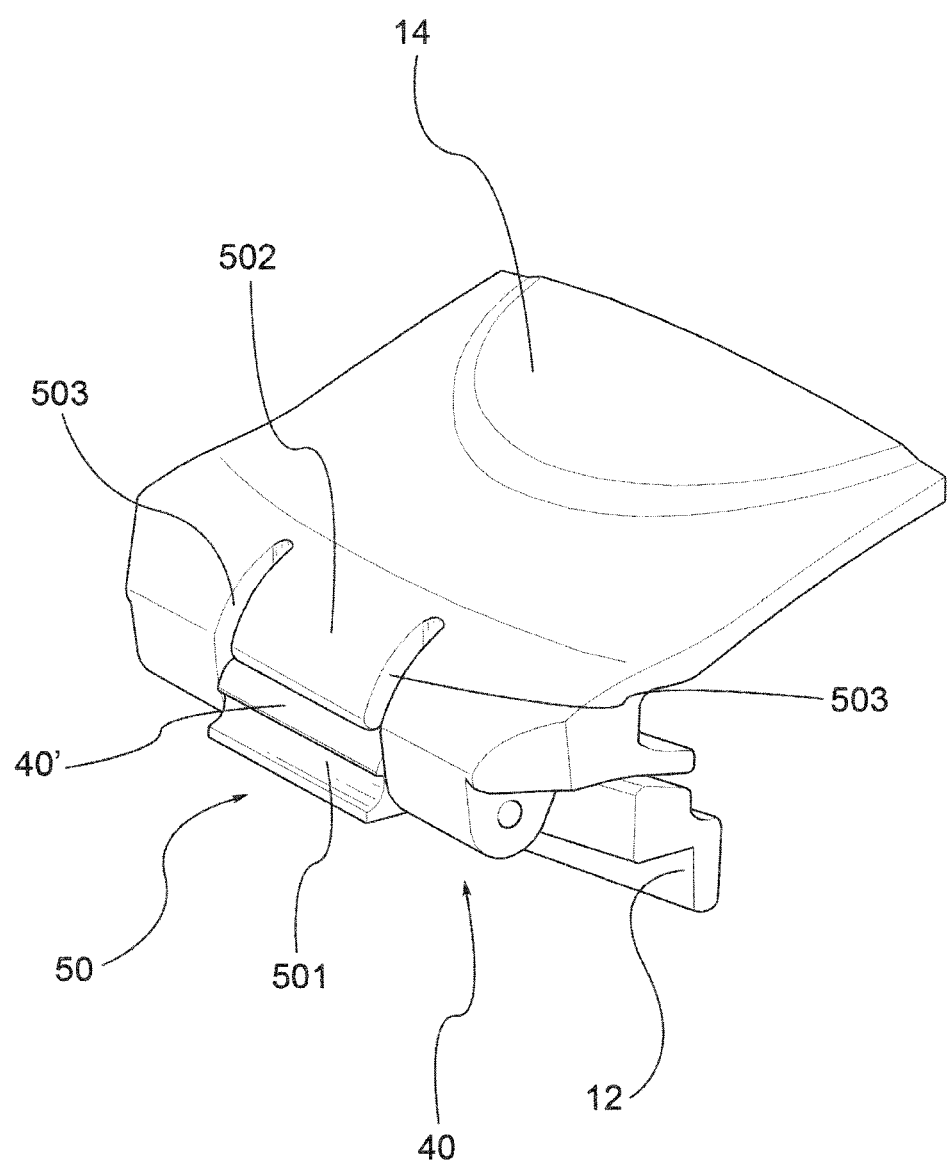
FIG. 8 is an enlarged view of the assembly in correspondence to the hinge connection between the support arm and annular element, in the closed position.
Figure 9:
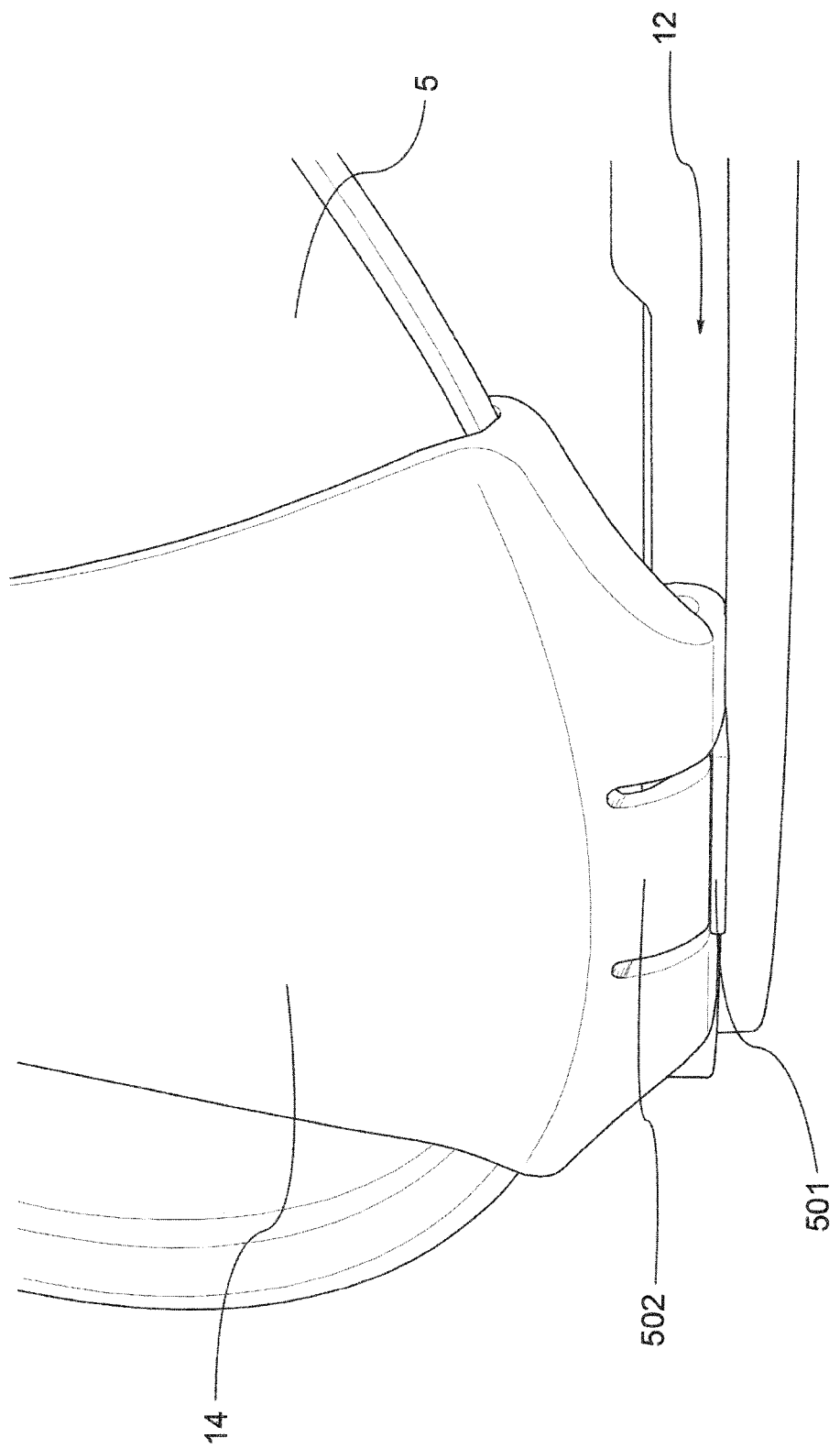
FIG. 9 is a view similar to the preceding, but with the lid raised.

When the support arm 14 is in the lowered closed position (FIG. 8), the elastic tab 502 is superimposed on the central portion 40' of the hinge 40 and is disengaged from the stop slot 501. By rotating the support arm 14 upward, the free end of the elastic tab 502 is inserted into the stop slot 501, flexing inward, until it stops against a stop surface 501', which superiorly delimits the stop slot 501 (FIG. 9). In this position, the support arm 14 cannot rotate further and the bending of the flexible tab 502 within the stop slot 501 generates a resistant force which balances the weight force that would tend to bring the support arm 14 with the related lid 5 to the lowered closed position. The support arm 14 thus remains in a condition of equilibrium that allows the user to free both hands.

To return the support arm to the lowered position of closure, it is sufficient to exert a slight pressure on the knob or grip handle 18 of the support device 14, so as to overcome the resisting force produced by the interaction of the flexible tab 502 with the stop slot 501. Following this pressure, the free end of the flexible tab 502 snaps out of the stop slot 501 and the support device 14 is then free to rotate towards the lowered closed position.

To the embodiments of support devices and closure assemblies according to the invention, a skilled person, to satisfy contingent requirements, may make modifications, adaptations and replacements of members with others functionally equivalent, while remaining within the scope of protection claimed herein. Each of the characteristics described as belonging to a possible embodiment may be achieved independently or in combination with other embodiments described herein.

The invention claimed is:

1. A removable support device for cooking comprising:
an annular element suitable for abutting a rim of a cooking container,
a support arm hinged to said annular element,
a lid, and
an attachment element to connect the support arm and the lid
wherein the support arm is movable between a lowered position in which the support arm allows the lid to rest upon the annular element and a raised position in which the support arm distances the lid from the annular element,
wherein the annular element is provided with blocking elements for the lid suitable for keeping the support arm in a lowered position, and
wherein said blocking elements are configured to engage a top side of an outer rim of the lid.

2. The support device of claim 1, wherein said attachment element is provided in a coaxial position to the centre of the annular element.

3. The support device of claim 1, wherein said blocking elements comprise a lateral lever which extends upward from the annular element and which is movable between a blocking position and a release position of the lid.

4. The support device of claim 3, wherein said lateral lever defines an undercut which, when the lateral lever is in a blocked position, is suitable for engaging the rim of the lid at the top.

5. The support device of claim 4, wherein a support tooth for a lid is made in said lateral lever, above the undercut, suitable for permitting the lid to rest in an intermediate position between the lowered position and the raised position of the container.

6. The support device of claim 3, wherein said lateral lever is elastically yielding.

7. The support device of claim 1, wherein a concave support seat for a cooking utensil is formed in said lateral lever.

8. The support device of claim 1, wherein said annular element comprises a vertical wall suitable for surrounding at least partially the rim of the container, elastic compensation elements suitable for radially engaging the rim of the container which are associated with said vertical wall.

9. The support device of claim 8, wherein said elastic compensation elements comprise a plurality of elastic teeth evenly distributed along the annular element and projecting radially from said vertical wall.

10. The support device of claim 1, wherein the annular element forms, at a connection hinge to the support arm, a droplet collection chute suitable for collecting and channelling inside the container droplets forming on the inside of the lid.

11. The support device of claim 1, wherein the support arm comprises a knob or grip handle.

12. The support device of claim 1, wherein the support arm and annular element are provided with stop elements which reciprocally interact to stop and keep the support arm in the raised position.

13. The support device of claim 1, comprising stop elements which comprise a stop slot formed in the annular element and an elastic stop tab integral with the support arm, the elastic stop tab being suitable for being engaged in said stop slot following an upward rotation of the support arm.

* * * * *